(12) United States Patent
Pensel

(10) Patent No.: US 6,493,134 B2
(45) Date of Patent: Dec. 10, 2002

(54) SURGICAL MICROSCOPE

(75) Inventor: Juergen Pensel, Altstätten (CH)

(73) Assignee: Leica Microsystems AG, Heerbrugg (CH)

( * ) Notice: Subject to any disclaimer, the term of this patent is extended or adjusted under 35 U.S.C. 154(b) by 100 days.

(21) Appl. No.: 09/772,788

(22) Filed: Jan. 30, 2001

(65) Prior Publication Data

US 2001/0043392 A1 Nov. 22, 2001

Related U.S. Application Data

(60) Provisional application No. 60/180,557, filed on Feb. 4, 2000.

(51) Int. Cl.[7] ............................................. G02B 21/24
(52) U.S. Cl. ...................... 359/388; 359/389; 359/368; 359/376
(58) Field of Search ................................ 359/388, 389, 359/368, 376; 396/315, 316, 318; 307/11, 18, 19, 25–29

(56) References Cited

U.S. PATENT DOCUMENTS

| 4,453,414 A | * | 6/1984 | Ronemus et al. ............. 73/827 |
| 5,048,941 A | * | 9/1991 | Hamada et al. ............... 307/43 |
| 6,103,600 A | * | 8/2000 | Ueda et al. .................. 257/213 |
| 6,130,518 A | * | 10/2000 | Gabehart et al. ........... 320/103 |
| 6,438,326 B1 | * | 8/2002 | Niederecker et al. ....... 396/315 |

* cited by examiner

Primary Examiner—Mohammad Sikder
(74) Attorney, Agent, or Firm—Hodgson Russ LLP

(57) ABSTRACT

The invention concerns a microscope having a power and data transfer system between a microscope body (1) and an external control device or peripheral device (2, 13). According to the present invention, the power line (4) and data line (7) are laid physically together and are of integrated configuration, thus implementing a lightweight connection comprising few individual cables.

9 Claims, 3 Drawing Sheets

SURGICAL MICROSCOPE

CROSS-REFERENCE TO RELATED APPLICATIONS

The present application claims benefit under 35 U.S.C. § 119(e) of U.S. Provisional Patent Application Ser. No. 60/180,557 filed Feb. 4, 2000.

BACKGROUND OF THE INVENTION

A. Field of the Invention

The invention relates generally to surgical microscopes, and more particularly to an improved configurations for linking a microscope body to an external power supply, control device, and light source.

B. Description of the Prior Art

A "surgical microscope" for the purposes of the invention is understood to be a microscope that is movable with respect to an object and thus possesses a certain flexibility in terms of any connections to external devices. Such microscopes are very often used in surgical operations. Such microscopes are often also used for industrial or commercial applications.

Such microscopes often have an integrated illumination system in which the light source is built into the microscope. Often, however, the light source is remotely located so as to minimize heating, weight, and housing dimensions in the region of the microscope body. With such external accessories, the light is directed through a light guide from the external light source to the microscope body, and through the latter onto the surgical field.

In addition, such microscopes—and video cameras incorporated into them—are often equipped with control elements, for example remotely controllable displacement mechanisms or actuators which comprise on the one hand electrical drive systems but also, on the other hand, sensors or the like whose signals are analyzed in external control systems or circuits.

Such microscopes are often located on the extension arms of stands, while the external devices and control systems are housed in the column region of the stand.

The connection between the external devices and the microscope body or the terminals located thereon is accomplished via flexible lines such as light guides, electrical cables, electronic data lines, etc. As a rule there are numerous such lines, which in many applications are a hindrance. In some cases they interfere with visibility, are heavy, result in jamming and limitations of movement, and moreover look untidy. In addition, they are susceptible to malfunction or can cause failures by being damaged. In the field of surgical microscopy, they result in increased surface areas which thus make the overall structure more susceptible to soiling.

The assignee of the present application has already taken initial steps intended to remedy this unfavorable situation. Assignee's OH stand had provided, between stand arms, a flexible hose through which all the various cables were pulled. This hose was relatively bulky and inflexible, however, and did not make optimum use of space since it had to be made sufficiently large for subsequent installation of an undetermined number of cables, even if not all the cables were pulled through. The dead weight of the hose moreover increased the weight of the stand arms in question.

SUMMARY OF THE INVENTION

It is thus the object of the invention to implement the connection between the external devices and the microscope body in as lightweight, easily movable, and retrofittable a fashion as possible, and with as few cables as possible.

The present invention, as broadly defined, achieves this principal object on the basis of a physical size reduction and simultaneous weight reduction. Further improved or developed ways of achieving the object, with greater integration and greater advantages over the existing art, are evident from the various embodiments described herein.

A preferred configuration of a cable according to the present invention, which optionally can also be used independently of the invention, is coaxially multi-layered, one of the layers, but preferably the core of the cable, being configured as a mirror optical system or fiber optical system or as a liquid light guide, while at least two layers are configured as an at least two-pole power cable. Preferably connected to the light-guide portion of such a cable are electro-optical converters for the transfer of control, sensor, and video signals, while the power supply is connected to the power portion.

Further improvements and details of the invention are evident from the drawings, which depict exemplary embodiments according to the present invention.

BRIEF DESCRIPTION OF THE DRAWING

The nature and mode of operation of the present invention will now be more fully described in the following detailed description of the preferred embodiment taken with the accompanying drawing figure, in which.

DETAILED DESCRIPTION OF THE PREFERRED EMBODIMENTS

Figure 1:
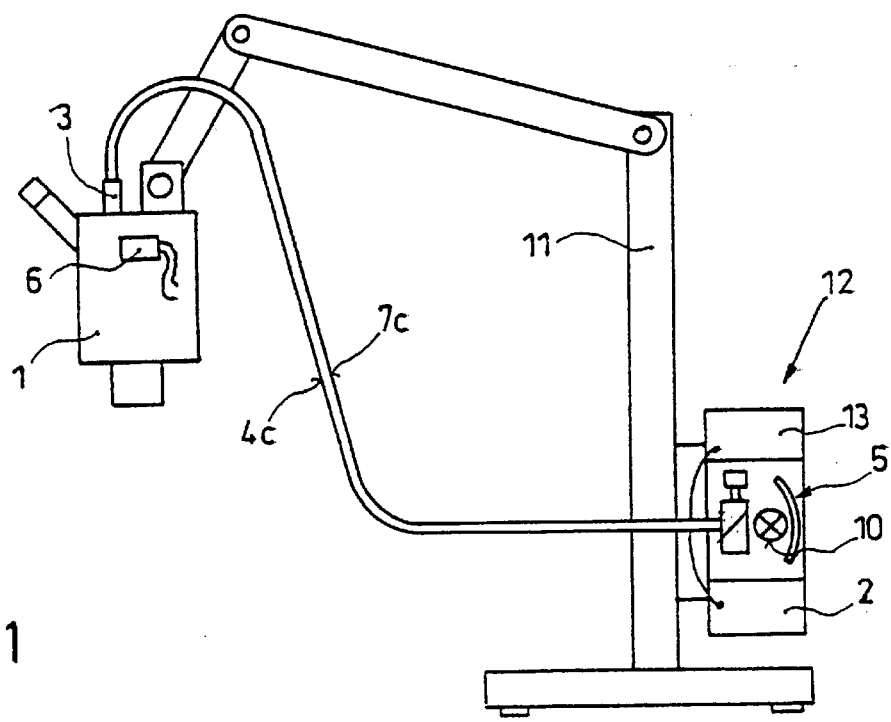
FIG. 1 shows a schematic complete surgical microscope according to the present invention, on a stand, with corresponding external devices.
Figure 2:
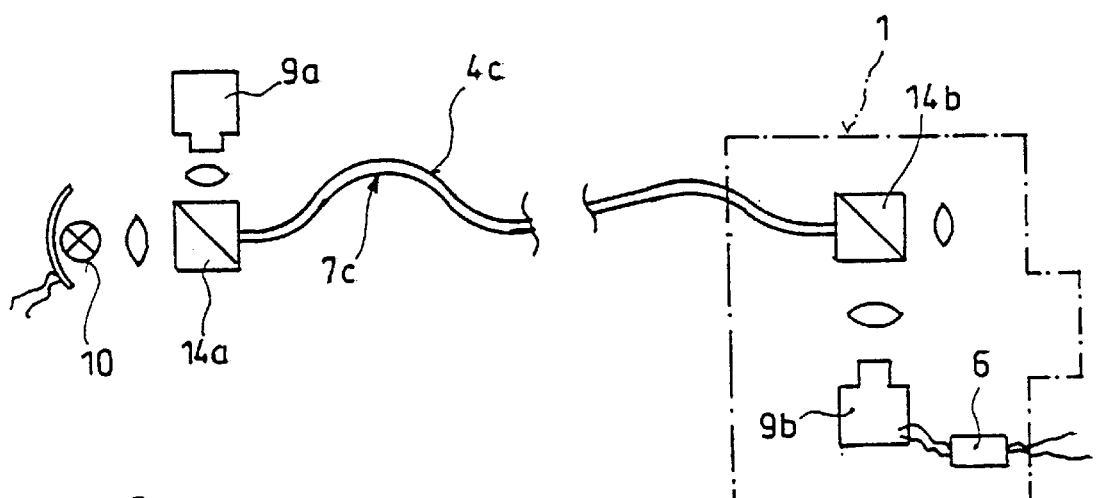
FIG. 2 shows a detail of a light guide modified in accordance with the invention, having electro-optical data converters and apparatuses for reflecting light in and out.

The figures will be described in overlapping fashion. Identical parts bear identical reference characters; different parts having functions that are identical in principle bear identical reference characters with differing indices. The figures do not limit the invention, but rather are intended as possible exemplary embodiments.

FIG. 1 shows a schematic configuration with a stand 11 that bears a microscope body 1 and various external devices 12. These comprise, for example, a computer 13 for control and measurement tasks, a light source 10 for providing light flux that can be used as a power supply 5 and/or directed to microscope body 1 and onto a surgical field. A power connection 4c in the form of a light guide transmits power in the form of light flux. A control device is connected to remotely controlled drive systems in the microscope, for example via a data connection 7c integrated, in accordance with the invention, into power connection light guide 4c. The microscope thus comprises a terminal 3 for power connection 4c and a terminal 6 for the data connection.

In this example, the data connection is implemented via electro-optical converters 9a and 9b that convert electrical signals into optical signals and vice versa. These signals are reflected into and out of light guide 4c via beam splitters or mirrors 14a and 14b, so that by way of these, both the light flux from the light source and the optical signals from converter 9a are sent to the microscope, and optical signals from converter 9b are sent in the other direction to computer 13 and to control device 2.

An extremely wide variety of combinations lies within the context of the invention. For example, the power that is to be transferred can be optical and/or electrical power, while the data can be electrical and/or optical signals. This includes the case in which electrical signals are transferred over the light guide by light modulation.

Figure 7:
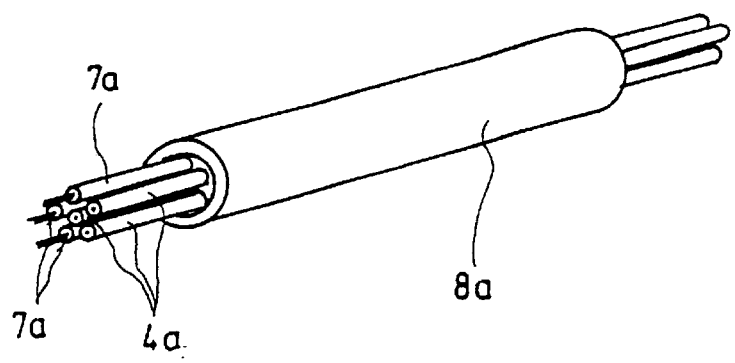
FIG. 7 shows a multi-strand cable as power and data carrier.

Some of the possibilities are explained with references to the examples shown in FIGS. 3 through 8:

FIG. 7 shows a relatively simple configuration which does not provide any integrated light flux transfer, but does provide an electrical power transfer in power wires 4a of a multi-strand cable 8a, while data transfer occurs in data lines 7a of the same cable 8a.

Figure 8:
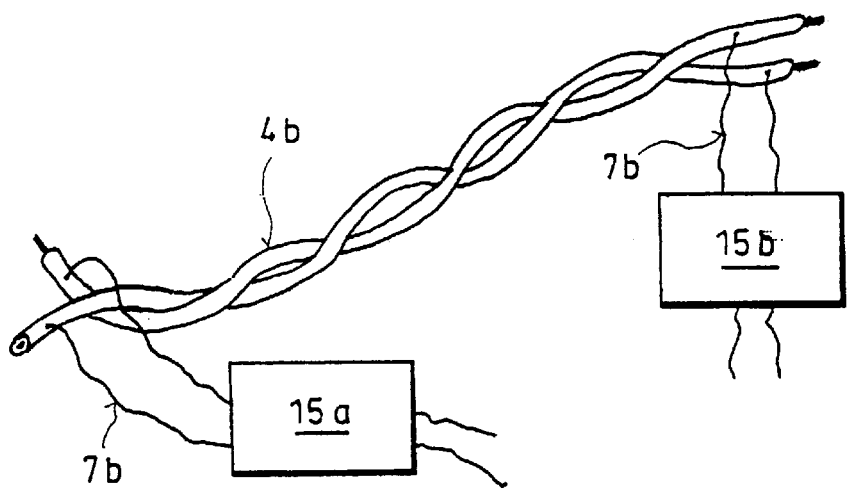
FIG. 8 shows a two-pole cable that serves as both a power line and a data line.

FIG. 8 uses only a two-pole power cable 4b that is of twisted configuration for better shielding effect. By way of this power cable, a high-frequency (relative to the power flow) data transfer is performed simultaneously; for this purpose, corresponding signal couplers 15a and 15b are provided, which are connected at the other end to terminal 6 and to computer 13 or control device 2.

Figure 3:
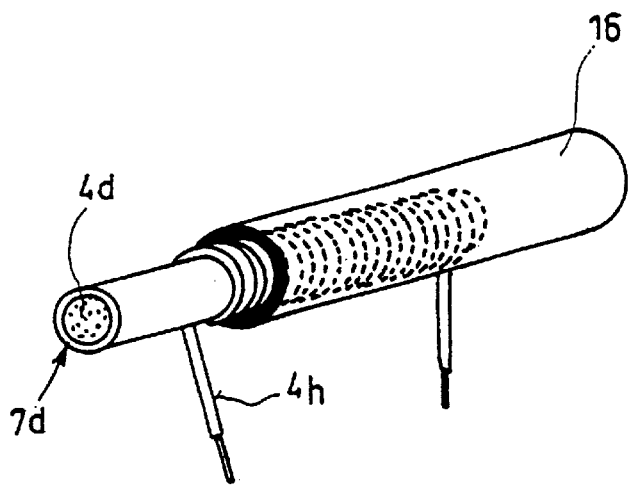
FIG. 3 shows another light guide with special armoring.
Figure 4:
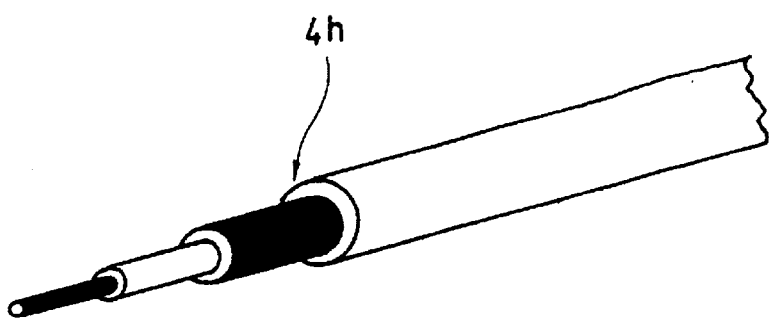
FIG. 4 shows a detail of the armoring as shown in FIG. 3.
Figure 5:
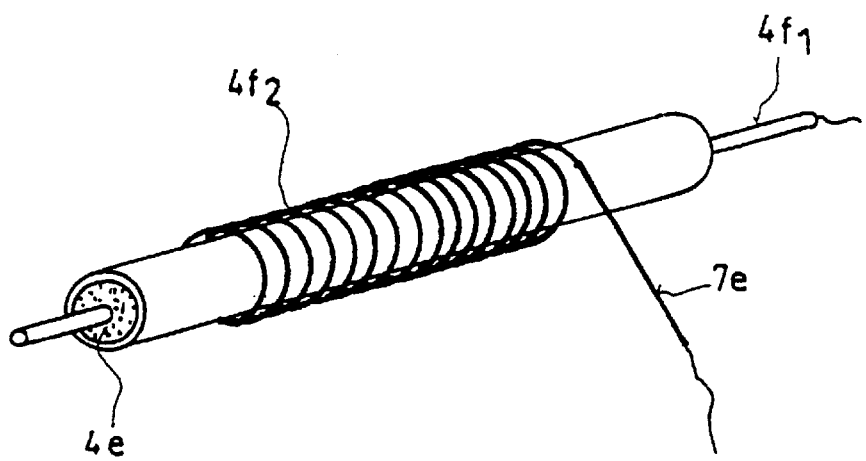
FIG. 5 shows a variant of the light guide as shown in FIG. 3.

Signal couplers of this kind are optionally also provided in configurations according to FIGS. 3 through 5, if the electrical lines are also intended to be used for data purposes in the case of these configurations.

Figure 6:
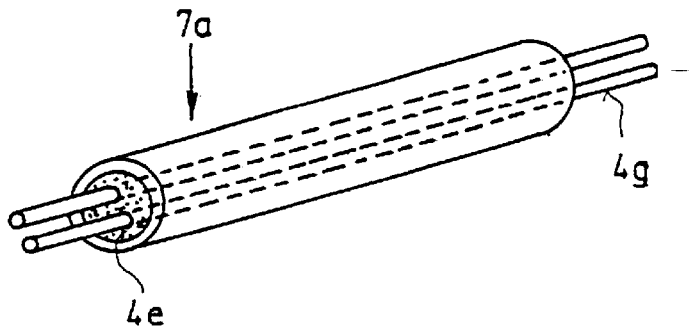
FIG. 6 shows a further variant of the light guide as shown in FIG. 3.

FIG. 6 shows a light guide 4e that has as its core a two-pole electrical cable 4g.

FIG. 3 shows another light guide in which a two-pole cable (in this example, a coaxial cable) 4h is wound as armoring around light guide 4d. For strengthening purposes, a tubular sheath 16 is also pulled on as an outer layer.

FIG. 4 shows a detailed depiction of the coaxial cable according to FIG. 3, which of course in addition to power transfer could also be used for data transfer (although with less bandwidth than in the case of light). In this example, what is intended is a data transfer via light guide 4d.

FIG. 5 shows a combination of the examples shown in FIG. 3 and in FIG. 6, with a single-pole armoring 4f2 that, for example, can also be constituted from a conventional corrugated metal tube, and with a single-pole core 4f1 inside light guide 4e. This configuration also results in a favorable shielding effect due to the coaxial configuration of electrical conductors 4f1 and 4f2. Data can thus be transmitted through these easily and without interference, so that data transfer via light guide 4e can optionally be dispensed with.

The signals mentioned above preferably comprise amplitude-modulated or frequency-modulated current, or light including nonvisible light wavelength regions, for example infrared.

The invention encompasses, on the one hand, corresponding modulation of the electrical or light fluxes that are flowing in the manner of power, and/or the fact that electrical or optical signals are sent, parallel to these flow power fluxes, over the same line in each case.

| List of Reference Characters: | |
|---|---|
| 1 | Microscope body |
| 2 | Control device |
| 3 | Power terminal |
| 4 | Power connection |
| 5 | Power supply unit |
| 6 | Data terminal |
| 7 | Data connection |
| 8 | Cable |
| 9 | Conversion device; electro-optical converter |
| 10 | Light source |
| 11 | Stand |
| 12 | External devices |
| 13 | Computer |
| 14 | Beam splitter |
| 15 | Signal coupler |
| 16 | Tubular sheath |

What is claimed is:

1. A surgical microscope comprising:

a microscope body including a power terminal and a data terminal;

a power supply outside said microscope body;

a control device outside said microscope body;

a power connection running between said power supply and said power terminal for transmitting power from said power supply to said microscope body, wherein said power comprises a light flux and said power connection includes a light guide;

a data connection running between said control device and said data terminal for transmitting data from said control device to said microscope body and from said microscope body to said control device, said data connection being a light guide for transmitting data in the form of optical light signals;

an electro-optical converter associated with said control device for converting electrical signals used by said control device to optical light signals sent over said data connection and for converting optical light signals received over said data connection to electrical signals used by said control device; and an electro-optical converter associated with said microscope body for converting electrical signals used by said microscope body to optical light signals sent over said data connection and for converting optical light signals received over said data connection to electrical signals used by said microscope body;

wherein said power connection and said data connection are of an integrated configuration.

2. The microscope as defined in claim 1, wherein said data connection and said power connection are provided in the same light guide.

3. The microscope as defined in claim 2, further comprising a light source associated with said light guide for generating surgical field illumination.

4. The microscope as defined in claim 1, wherein said power further comprises electrical power, and said light guide includes an electrical line.

5. The microscope as defined in claim 4, wherein said electrical line is configured as armoring about said light guide.

6. The microscope as defined in claim 4, wherein said electrical line is configured as a core for said light guide.

7. The microscope as defined in claim 4, further comprising a light source associated with said light guide for generating surgical field illumination.

8. The microscope as defined in claim 1, wherein said microscope body is supported and positioned by a stand having sensors and drive systems, and said sensors and drive systems are linked to said power supply through said power connection.

9. The microscope as defined in claim 1, wherein said microscope body is supported and positioned by a stand having sensors and drive systems, and said sensors and drive systems are linked to said control device through said data connection.

* * * * *